United States Patent
Kverel et al.

(10) Patent No.: US 11,198,808 B2
(45) Date of Patent: *Dec. 14, 2021

(54) INORGANIC FULLERENE-LIKE PARTICLES AND INORGANIC TUBULAR-LIKE PARTICLES IN FLUIDS AND LUBRICANTS

(71) Applicant: Nanotech Industrial Solutions, Inc., Avenel, NJ (US)

(72) Inventors: Eugene Kverel, New York, NY (US); George Diloyan, Cranford, NJ (US)

(73) Assignee: NANOTECH INDUSTRIAL SOLUTIONS, INC., Avenel, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,056

(22) Filed: Dec. 10, 2019

(65) Prior Publication Data

US 2020/0115608 A1    Apr. 16, 2020

Related U.S. Application Data

(63) Continuation of application No. 14/182,949, filed on Feb. 18, 2014, now Pat. No. 10,501,673.
(Continued)

(51) Int. Cl.
*C09K 8/03* (2006.01)
*C10M 125/22* (2006.01)
(Continued)

(52) U.S. Cl.
CPC ........... *C09K 8/032* (2013.01); *C10M 125/22* (2013.01); *C09K 2208/34* (2013.01);
(Continued)

(58) Field of Classification Search
CPC .............. C10M 125/22; C10M 125/10; C10M 2201/065; C10M 2215/08; C09K 2208/34; C09K 8/032; C10N 2230/06; C10N 2220/082; C10N 2240/10; C10N 2040/25; C10N 2030/06; C10N 2020/06; C10N 2010/12
See application file for complete search history.

(56) References Cited

U.S. PATENT DOCUMENTS 2,329,878 A    9/1943   Baruch
3,275,551 A    9/1966   Annis
(Continued)

FOREIGN PATENT DOCUMENTS

WO    2007082299 A2    7/2007
WO    WO-2012166615 A1 *  12/2012   ............. B82Y 30/00

OTHER PUBLICATIONS

European Search Report and Written Opinion issued in European Application No. 20153073.0, dated Apr. 2, 2020, pp. 1-14.
(Continued)

*Primary Examiner* — Vishal V Vasisth
(74) *Attorney, Agent, or Firm* — Tutunjian & Bitetto, P.C.

(57) ABSTRACT

A lubricant including a fluid medium and at least one intercalation compound of a metal chalcogenide having molecular formula $MX_2$, where M is a metallic element such as tungsten (W), and X is a chalcogen element such as sulfur (S), wherein the intercalation compound has a fullerene-like hollow structure or tubular-like structure.

20 Claims, 8 Drawing Sheets

Related U.S. Application Data (60) Provisional application No. 61/766,431, filed on Feb. 19, 2013.

(51) Int. Cl.
| | | |
|---|---|---|
| *C10M 125/10* | (2006.01) | |
| *C10N 20/06* | (2006.01) | |
| *C10N 30/06* | (2006.01) | |
| *C10N 40/25* | (2006.01) | |

(52) U.S. Cl.
CPC ..... *C10M 125/10* (2013.01); *C10M 2201/065* (2013.01); *C10M 2215/08* (2013.01); *C10N 2020/06* (2013.01); *C10N 2030/06* (2013.01); *C10N 2040/25* (2013.01)

(56) References Cited

U.S. PATENT DOCUMENTS

| | | |
|---|---|---|
| 7,510,760 B2 | 3/2009 | Malshe et al. |
| 8,486,870 B1 | 7/2013 | Malshe |
| 8,492,319 B2 | 7/2013 | Malshe et al. |
| 2002/0182331 A1 | 12/2002 | Oldiges et al. |
| 2003/0220204 A1* | 11/2003 | Baran, Jr. ............ C09K 8/58 507/200 |
| 2005/0065044 A1 | 3/2005 | Migdal et al. |
| 2006/0063637 A1 | 3/2006 | Law |
| 2007/0111319 A1 | 5/2007 | Bastide et al. |
| 2007/0215360 A1 | 9/2007 | Shuster et al. |
| 2009/0032499 A1 | 2/2009 | Tenne et al. |
| 2011/0162751 A1 | 7/2011 | Fitzgerald et al. |
| 2012/0032543 A1 | 2/2012 | Chakraborty et al. |
| 2012/0329686 A1 | 12/2012 | Tenne et al. |

OTHER PUBLICATIONS

Shahar, C. et al., "Surface Functionalization of WS2 Fullerene-like Nanoparticles" Langmuir (Mar. 2010) pp. 4409-4414, vol. 26, No. 6.

Huang, H.D. et al., "Friction and wear propertied of IF-MoS2 as additive in paraffin oil" Tribology Letters (Dec. 2005) pp. 247-250, vol. 20, Nos. 3-4.

Verma, A. et al., "Tribological Behavior of Deagglomerated Active Inorganic Nanoparticles for Advanced Lubrication" Tribology Transactions (Sep. 2008) pp. 673-678, vol. 51.

Yang, H. et al., "Synthesis of inorganic fullerene-like WS2 nanoparticles and their lubricating performance" Nanotechnology (Feb. 2006) pp. 1512-1519.

Yang et al., "Synthesis of inorganic fullerene-like WS2 nanoparticles and their lubricating performance" Nanotechnology (Feb. 2006) pp. 1512-1519, vol. 17.

International Search Report and Written Opinion dated Jun. 10, 2014 for International Appl. No. PCT/US2014/016907.

International Search Report and Written Opinion dated Jul. 24, 2014 for International Appl. No. No. PCT/US2014/016928.

* cited by examiner

INORGANIC FULLERENE-LIKE PARTICLES AND INORGANIC TUBULAR-LIKE PARTICLES IN FLUIDS AND LUBRICANTS

CROSS REFERENCE TO RELATED APPLICATIONS

This application is a continuation of U.S. application Ser. No. 14/182,949 filed Feb. 18, 2014, now patent Ser. No. 10/501,673, titled "INORGANIC FULLERENE-LIKE PARTICLES AND INORGANIC TUBULAR-LIKE PARTICLES IN FLUIDS AND LUBRICANTS AND APPLICATIONS TO SUBTERRANEAN DRILLING", which is incorporated herein in its entirety by reference. This application claims the benefit of U.S. Provisional Application No. 61/766,431 filed Feb. 19, 2013, titled "INORGANIC FULLERENE-LIKE PARTICLES AND INORGANIC TUBULAR-LIKE PARTICLES IN FLUIDS AND LUBRICANTS AND APPLICATIONS TO SUBTERRANEAN DRILLING", which is incorporated herein in its entirety by reference.

FIELD OF THE INVENTION

The present disclosure relates to inorganic particles having a fullerene-like and tubular-like geometry in a fluid lubricant. In some embodiments, the inorganic particles with the fullerene-like and tubular-like geometry are employed in a drilling fluid.

BACKGROUND

Oils and lubricants are used for a variety of applications, including providing lubrication for engines and motors to extend lifetime and prevent failure. Oils that are used as lubricants provide lubrication between two moving surfaces, such as for example, bearings and other metal surfaces.

Drilling fluids (muds) are normally used in drilling oil and gas wells. These fluids are used to maintain pressure, cool drill bits, and lift cuttings from the holes as the well is being drilled. Drilling fluids vary greatly in composition depending upon specific requirements of the well being drilled, as well as geological considerations.

SUMMARY

In one embodiment of the present disclosure, a lubricant is provided. In one embodiment, the lubricant comprises a fluid medium and at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation compound has at least one of a fullerene-like structure or tubular-like structure. The intercalation compound is present in the lubricant in an amount of greater than 0.1 wt %. The lubricant further includes a functionalizing agent. The functionalizing agent provides that the intercalation compound is kept in suspension within the fluid medium.

In another embodiment, a drilling fluid is provided. The drilling fluid includes a drilling fluid medium selected from the group consisting of water, air and water, air and foaming agent, a water based mud, an oil based mud, a synthetic based fluid, and a combination thereof. The drilling fluid further comprises at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation compound has a fullerene-like structure or tubular-like structure. The intercalation compound is present in the drilling fluid in an amount of greater than 0.1 wt %.

In another aspect, a subterranean drilling method is provided that includes providing a drilling member, applying the drilling member to a surface to form a subterranean wellbore, and lubricating at least one of the subterranean wellbore and the drilling member with a drilling fluid including at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation compound has a fullerene-like structure or tubular-like structure. The intercalation compound is present in the drilling fluid in an amount of greater than 0.1 wt % by weight.

BRIEF DESCRIPTION OF DRAWINGS

The following detailed description, given by way of example and not intended to limit the disclosure solely thereto, will best be appreciated in conjunction with the accompanying drawings, wherein like reference numerals denote like elements and parts, in which.

DETAILED DESCRIPTION

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

In one embodiment, a lubricant is provided that includes a fluid medium and at least one intercalation compound of a metal chalcogenide having molecular formula $MX_2$ that is in suspension in the fluid medium, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

The fluid medium may be water based, oil based or can be an emulsion of water and oil. In one example, the fluid medium is an oil selected from Group I, II, III, IV and V, as designated by the American Petroleum Institute (API). Group I base oils are classified as less than 90 percent saturates, greater than 0.03 percent sulfur (S) with a viscosity-index range of 80 to 120. In some embodiments, the temperature range for these oils is from 32 degrees F. to 150 degrees F. Group I base oils can be manufactured by solvent extraction, solvent or catalytic dewaxing, and hydro-finishing processes. Common Group I base oil may include 150SN (solvent neutral), 500SN, and 150BS (brightstock). Group I base oils are typically mineral oils.

Group II base oils are defined as being more than 90 percent saturates, less than 0.03 percent sulfur and with a viscosity index of 80 to 120. Group II base oils can be often manufactured by hydrocracking. Since all the hydrocarbon molecules of these oils are saturated, Group II base oils have better antioxidation properties than Group I base oils. Group II base oils are also typically mineral oils.

Group III base oils are defined as being greater than 90 percent saturates, less than 0.03 percent sulfur and have a viscosity index above 120. These oils are refined even more than Group II base oils and generally are hydrocracked with a higher pressure and heat than Group II. The processing for forming Group III base oils are typically longer than the processing for Group II base oils, and are designed to achieve a purer base oil. Although typically made from crude oil, Group III base oils are sometimes described as synthesized hydrocarbons. Group III base oils can be manufactured by processes, such as isohydromerization, and can be manufactured from base oil or slax wax from dewaxing process.

Group IV base oils are polyalphaolefins (PAOs). These synthetic base oils are made through a process called synthesizing. More specifically, in some embodiments, the process may begin with oligomerisation of alpha olefins and a catalyst. Oligomerization is followed by distillation. The oligomerization and distillation steps may include steam cracking hydrocarbons to produce ultra high-purity ethylene, ethylene oligomerization to develop 1-decene and 1-dodecene, and decene or dodecene oligomerization to form a mixture of dimers, trimers, tetramers and higher oligomers. Distillation is followed by hydrogenation including hydrogen and a catalyst. Group IV base oils such as polyalphaolefins (PAOs) are suitable for a broader temperature range that Group I, II and III base oils, and are applicable for use in extreme cold conditions and high heat applications. Group IV base oils typically have a viscosity index of at least 140.

Group V base oils are classified as all other base oils, including silicone, phosphate ester, polyalkylene glycol (PAG), polyolester, biolubes, etc. These base oils are at times mixed with other base stocks, such as the aforementioned Group I, II, III and IV base oils. An example would be polyalphaolefin (PAO) that is mixed with a polyolester. Esters are common Group V base oils used in different lubricant formulations to improve the properties of the existing base oil. In some embodiments, ester oils can take more abuse at higher temperatures and will provide superior detergency compared to a polyalphaolefin (PAO) synthetic base oil, which in turn increases the hours of use. Examples of synthetic oils include olefins, isomerized olefins, synthetic esters, phosphate esters, silicate esters, polyalkylene glycols, etc.

In another embodiment, the fluid component, i.e., fluid medium, of the lubricant can be a biolubricant. Biolubricants can primarily be triglyceride esters derived from plants and animals. Examples of biolubricants that are suitable for the fluid component that is mixed with the intercalation compound of the metal chalcogenide having the molecular formula $MX_2$ include lanolin, whale oil, canola oil, castor oil, palm oil, sunflower seed oil, rapeseed oil and tall oil.

In one example, the fluid medium is a water based fluid. The water based fluid may be a fluid or gel that is made from a base of water and typically a cellulose or glycerin solution. A water based fluid may be used on its own or in combination with other materials described herein to provide the fluid medium of the lubricant. It is noted that the above compositions provided for the fluid medium of the lubricants disclosed herein are provided for illustrative purposes only, and are not intended to limit the present disclosure. Other compositions and fluids have also been contemplated for use with the at least one intercalation compound of the metal chalcogenide having molecular formula $MX_2$.

The term "intercalation compound" denotes a compound that can be inserted between elements or layers. The intercalation compound typically has a fullerene-like or tube-like geometry. As used herein, the term "inorganic fullerene-like" denotes a sphere like geometry. The core of the fullerene-like geometry may be hollow, solid, amorphous, or a combination of hollow, solid and amorphous portions. A fullerene-like geometry may also be referred to as having a cage geometry. More specifically, in some embodiments, an intercalation compound having an inorganic fullerene like geometry may be a cage geometry that is hollow or solid at its core and layered at its periphery. For example, the intercalation compound having the inorganic fullerene like geometry may be a single layer or double layered structure. The intercalation compound is not limited on only single layer or double layered structures, as the intercalation compound may have any number of layers. These structures are also referred to in the art as being "nested layer structures". The inorganic fullerene like geometry of the nanpartilces may be spherical or near spherical, or may have a polyhedral geometry, with or without a hollow core.

Figure 1:
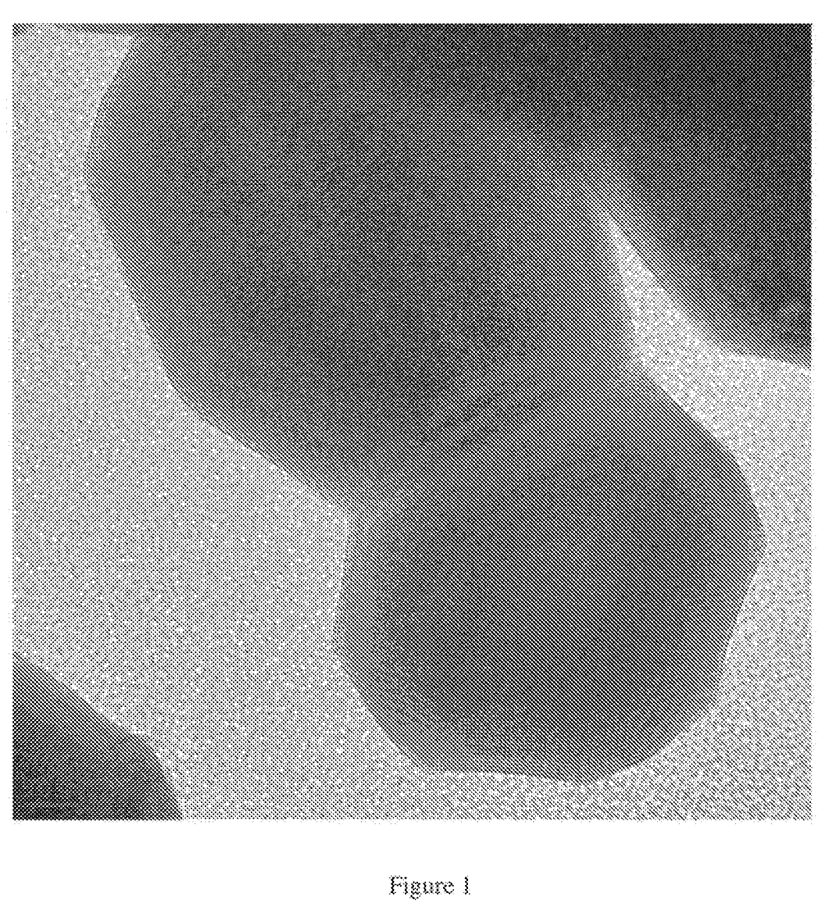
FIG. 1 is a transmission electron microscope (TEM) image of an intercalation compound of a metal chalcogenide having molecular formula $MX_2$ having a fullerene-like geometry, in accordance with one embodiment of the present disclosure.

One example of an intercalation compound having an inorganic fullerene-like geometry is depicted in FIG. 1. FIG. 1 depicts a transmission electron microscope (TEM) image of an intercalation compound having a tungsten disulfide ($WS_2$) composition with an inorganic fullerene-like geometry. In another example, the intercalation compound having the inorganic fullerene like geometry is composed of molybdenum disulfide ($MoS_2$). It is noted that the intercalation compound with the inorganic fullerene like geometry that is depicted in FIG. 1 is not limited to only tungsten disulfide ($WS_2$) and molybdenum disulfide ($MoS_2$). Intercalation compounds having a fullerene-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au) and mercury (Hg), and X is a chalcogen element selected from the group consisting of Sulfur (S), selenium (Se), tellurium (Te) and oxygen (O). The intercalation compound having an inorganic fullerene like geometry may have a diameter ranging from 1 nm to 15 μm. In another embodiment, the intercalation compound may have a diameter ranging from 2 nm to 10 μm. In yet another embodiment, the intercalation compound may have a diameter ranging from 5 nm to 5 μm. In some examples, the intercalation compound having an inorganic fullerene like geometry may have a diameter ranging from 20 nm to 500 nm. In other examples, the intercalation compound having the inorganic fullerene like geometry may have a diameter ranging from 30 nm to 200 nm. The intercalation compound having the inorganic fullerene-like geometry may have a diameter that is any value within the above ranges. It is noted that the above dimensions are provided for illustrative purposes only, and are not intended to limit the present disclosure.

As used herein, the term "tube-like geometry" denotes a columnar or cylindrical geometry, in which one axis of the intercalation compound. In some embodiments, an intercalation compound having an inorganic tube-like geometry may be a cage geometry that is hollow or solid at its core and layered at its periphery. In one example, the tube-like geometry may be a cage geometry that is amorphouse at its and layered at its periphery. For example, the intercalation compound having the inorganic tube-like geometry may be a single layer or double layered structure. These structures are also referred to in the art as being "nested layer structures".

Figure 2:
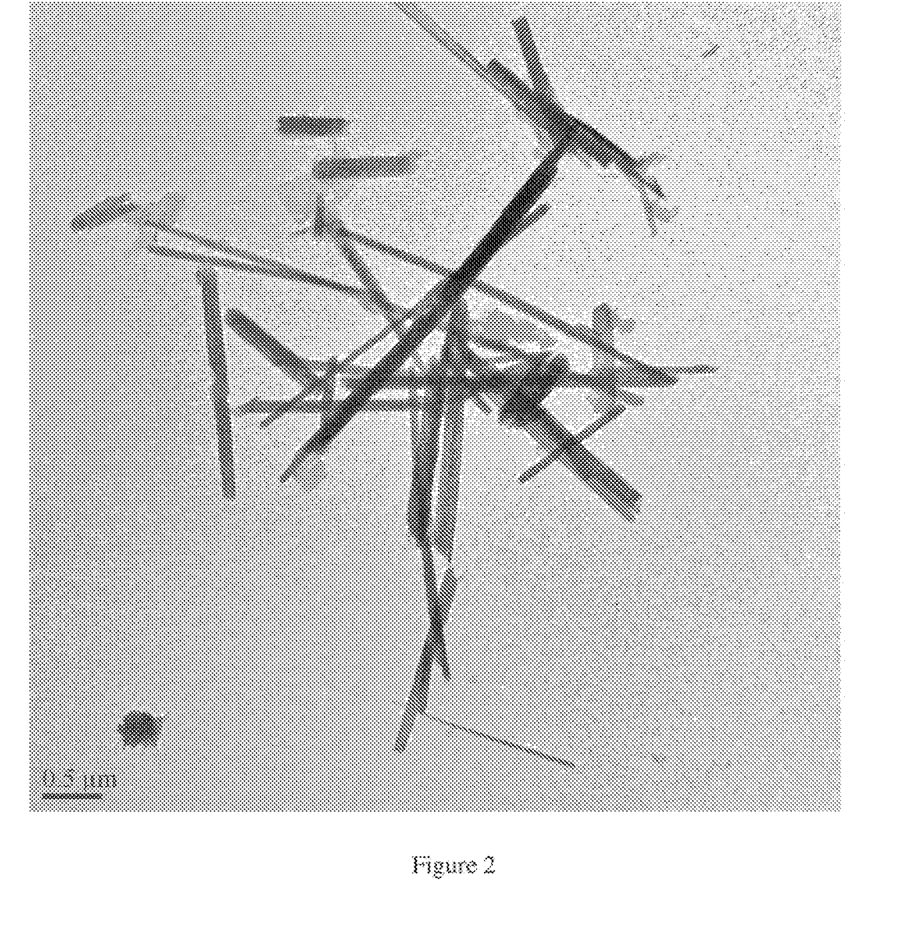
FIG. 2 is a transmission electron microscope (TEM) image of an intercalation compound of a metal chalcogenide having molecular formula $MX_2$ having a tube-like geometry, in accordance with one embodiment of the present disclosure.

One example of an intercalation compound having an inorganic fullerene like geometry is depicted in FIG. 2. FIG. 2 depicts a transmission electron microscope (TEM) image of an intercalation compound having a tungsten disulfide ($WS_2$) composition with an inorganic tubelike geometry. In another example, the intercalation compound having the inorganic tube-like geometry is composed of molybdenum disulfide ($MoS_2$). It is noted that the intercalation compound with the inorganic tube-like geometry that is depicted in FIG. 2 is not limited to only tungsten disulfide ($WS_2$) and molybdenum disulfide ($MoS_2$). Intercalation compounds having a tube-like geometry may have any inorganic composition that meets the formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au) and mercury (Rg), and X is a chalcogen element selected from the group consisting of Sulfur (S), selenium (Se), tellurium (Te) and oxygen (O).

The intercalation compound having an inorganic tube-like geometry may have a diameter ranging from 1 nm to 300 nm. In another embodiment, the intercalation compound may have an inorganic tube-like geometry with a diameter, i.e., distance perpendicular to the greatest axis of the tube-like geometry, ranging from 5 nm to 150 nm. In yet another embodiment, the intercalation compound may have an inorganic tube-like geometry with a diameter ranging from 10 nm to 100 nm. The intercalation compound having the inorganic tube-like geometry may have a length, i.e., greatest axis of the tube-like geometry, that ranges from 1 nm to 20 cm. In another embodiment, the intercalation compound having the inorganic tube-like geometry may have a length, i.e., greatest axis of the tube-like geometry, that ranges from 5 nm to 15 cm. In yet another embodiment, the intercalation compound having the inorganic tube-like geometry may have a length, i.e., greatest axis of the tube-like geometry, that ranges from 100 nm to 10 cm. The intercalation compound having the inorganic tube-like geometry may have a length or diameter that is any value within the above ranges. For example, inorganic tube-like geometry intercalatation compounds may have a length ranging from 5 microns to 20 microns. It is noted that the above dimensions are provided for illustrative purposes only, and are not intended to limit the present disclosure.

The intercalation compound having the metal chalcogenide composition, e.g., $WS_2$, and the fullerene-like geometry and/or tubular-like geometry may be produced via a sulfidization of tungsten oxide nanoparticles in reduction atmosphere in fluidized bed reactor. The intercalation compound may be formed in accordance with at least one of the methods disclosed in U.S. Pat. Nos. 6,217,843, 6,710,020, 6,841,142, 7,018,606 and 7,641,886, which are each incorporated herein in their entirety. It is noted that the methods disclosed in the forementioned patents are only some examples of methods that are suitable for forming the intercalation compound. Any method may be employed for forming the above-described intercalation compound, so long as the compound formed has a fullerene-like or tube-like geometry.

The intercalation compound of the inorganic fullerene-like and/or tube-like geometry is formula $MX_2$. The metallic elements that are suitable for M in the formula $MX_2$, and the chalcogen elements that are suitable for X in the formula $MX_2$ are provided above.

The surface of the inorganic fullerene-like and/or tube-like having the molecular formula $MX_2$ is functionalized or modified in order to obtain their homogeneous dispersion in the fluid medium of the lubricant, prevent particles agglomeration and settling. A "dispersion" is a system of two phases, in which discrete particles, i.e., primary particles, such as the inorganic fullerene-like and/or tube-like having the molecular formula $MX_2$, provide a first phase that are distributed in the other second phase, in which the second phase is a substantially continuous phase (dispersion medium) differing from the dispersed phase in composition. Dispersions are homogeneous when the ratio of solute, i.e., primary particles, such as the inorganic fullerene-like and/or tube-like having the molecular formula $MX_2$, to solvent, i.e., fluid medium, remains the same throughout the solution even if homogenized with multiple sources, and stable because, the solute will not settle out. This type of mixture, which is provided by the methods and compositions disclosed herein, is very stable, i.e., its particles do not settle, or separate. As used herein, "agglomeration" means an association of primary particles, which can range from relatively weak (based upon, for example, charge or polarity) to relatively strong (based upon, for example, chemical bonding). When the primary particles, i.e., inorganic fullerene-like and/or tube-like having the molecular formula $MX_2$, agglomerate they can fall, i.e., settle, from suspension. The methods and compositions that are provided herein provide dispersions that do not agglomerate or settle for a period of time that may be as great as 5 years, e.g., as great as 3 years. The dispersions are stabilized from agglomeration or settling by the functionalization agents that is described below, and the particle size that is provided by mechanical downgrading, such as particle size reductions provided by milling and/or high pressure homogenization and/or high shear mixing and/or ultrasonic mixing and/or a combination thereof.

The surface of the inorganic fullerene-like and/or tube-like particles having the molecular formula $MX_2$ may be functionalized or modified by forming an adsorption-solvate protective layer on the particle surfaces, i.e., surface of the inorganic fullerene-like and/or tube-like particles having the molecular formula $MX_2$, and preventing the close approach and coagulation of particles under the action of short-range forces of molecular attraction. The close approach of particles may be impeded by the disjoining pressure of the liquid dispersion medium, which is solvated by molecules or ions of the stabilizer in the adsorption layer, by electrostatic repulsion of like-charged ions adsorbed on the particle surfaces, or by enhanced structural viscosity of the surface protective layer, which can also be referred to as being a structural-mechanical barrier.

Surface functionalization for the surface of the inorganic fullerene-like and/or tube-like particles having the molecular formula $MX_2$ may by provided by functionalizing agents that include silanes, thiols, ionic, anionic, cationic, nonionic surfactants, amine based dispersant and surfactants, succinimide groups, fatty acids, acrylic polymers, copolymers, polymers, monomers and combinations thereof.

In some embodiments, the functionalizing agents can be described as comprising a headgroup (a part that interacts primarily with the surface of the inorganic fullerene-like and/or tube-like particles having the molecular formula $MX_2$) and a tailgroup (a part that interacts with the solvent, i.e., fluid medium). Useful headgroups include those that comprise alkoxy, hydroxyl, halo, thiol, silanol, amino, ammonium, phosphate, phosphonate, phosphonic acid, phosphinate, phosphinic acid, phosphine oxide, sulfate, sulfonate, sulfonic acid, sulfinate, carboxylate, carboxylic acid, carbonate, boronate, stannate, hydroxamic acid, and/or like moieties. Multiple headgroups can extend from the same tailgroup, as in the case of 2-dodecylsuccinic acid and (1-aminooctyl) phosphonic acid. Useful hydrophobic and/or hydrophilic tailgroups include those that comprise single or multiple alkyl, aryl, cycloalkyl, cycloalkenyl, haloalkyl, oligo-ethylene glycol, oligo-ethyleneimine, dialkyl ether, dialkyl thioether, aminoalkyl, and/or like moieties. Multiple tailgroups can extend from the same headgroup, as in the case of trioctylphosphine oxide.

Examples of silanes that are suitable for use as functionalizing agents with the inorganic fullerene-like and/or tube-like particles having the molecular formula $MX_2$ and the fluid medium of the present disclosure include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, ipropyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, polytriethoxysilane, vinyltrimethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri(t-butoxy)silane, vinyltris(isobutoxy)silane, vinyltris (isopropenoxy) silane, and vinyltris (2-methoxyethoxy) silane; trialkoxyarylsilanes; isooctyltrimethoxy-silane; N-(3-triethoxysilylpropy-1) methoxyethoxyethoxy ethyl carbamate; N-(3-triethoxysilylpropyl) methoxyethoxyethoxyethyl carbamate; silane functional (meth)acrylates including, e.g., 3-(methacryloyloxy) propyltrimethoxysilane, 3-acryloyloxypropyltrimethoxysilane, 3-(methacryloyloxy) propyltriethoxysi-lane, 3-(methacryloyloxy)propylmethyldimethoxysilane, 3-(acryloyloxypropyl) methyldimethoxysilane, 3-(methacryloyloxy) propyldime-thylethoxysilane, 3-(methacryloyloxy) methyltriethoxysilane, 3-(methacryloyloxy) methyltrimethoxysilane, 3-(methacryloyloxy) propyldimet-hylethoxysilane, 3-methacryloyloxy) propenyltrimethoxysilane, and 3-(methacryloyloxy) propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Examples of amines that are suitable for use as functionalizing agents with the inorganic fullerene-like and/or tube-like partilces having the molecular formula $MX_2$ and the fluid medium of the present disclosure include alkylamines including, e.g., octylamine, oleylamine, decylamine, dodecylamine, octadecylamine, monopolyethylene glycol amines, and combinations thereof.

Useful organic acid functionalizing agents include, e.g., oxyacids of carbon (e.g., carboxylic acid), sulfur and phosphorus, and combinations thereof.

Representative examples of polar functionalizing agents having carboxylic acid functionality include $CH_3O(CH_2CH_2O)_2C\text{—}H_2COOH$ (hereafter MEEAA) and 2-(2-methoxyethoxy) acetic acid having the chemical structure $CH_3OCH_2CH_2OCH_2COOH$ hereafter MEAA) and mono (polyethylene glycol) succinate in either acid or salt forms.

Representative examples of non-polar functionalizing agents having carboxylic acid functionality include octanoic acid, dodecanoic acid and oleic acid.

Examples of suitable phosphorus containing acids that are suitable as functionalizing agents include phosphonic acids including, e.g., octylphosphonic acid, laurylphosphonic acid, decylphosphonic acid, dodecylphosphonic acid, octadecylphosphonic acid, and monopolyethylene glycol phosphonate in either acid or salt forms.

Examples of other useful functionalizing agents include acrylic acid, methacrylic acid, beta-carboxyethyl acrylate, mono-2-(methacryloyloxyethyl) succinate, and combinations thereof. A useful surface modifying agent is mono (methacryloyloxypolyethyleneglycol-) succinate.

Examples of suitable alcohols for functionalizing agents include, e.g., aliphatic alcohols including, e.g., octadecyl, dodecyl, lauryl and furfuryl alcohol, alicyclic alcohols including, e.g., cyclohexanol, and aromatic alcohols including, e.g., phenol and benzyl alcohol, and combinations thereof.

In some embodiments, the functionalizing agents may be introduced to the inorganic fullerene-like and/or tube-like particles having the molecular formula $MX_2$ during their formation prior to having the opportunity to agglomerate or destabilize from solution. In other embodiments, agglomerates of the inorganic fullerene-like and/or tube-like particles having the molecular formula $MX_2$ are first mechanically broken down into their primary size, i.e., the size of the primary particles prior to agglomeration. The mechanical reduction of the agglomerates of the inorganic fullerene-like and/or tube-like particles having the molecular formula $MX_2$ to their primary size may be referred to as milling.

In some embodiments inorganic fullerene nanoparticles can be mixed with other solid particles, which may be from 1 nm to 10 microns in size, such as carbon fullerenes, carbon nanotubes, graphite, $2H\text{—}MoS_2$, $2H\text{—}WS_2$, boron, Zn, Cu, silver, graphite, MgOH, carbon diamond or combinations of thereof.

In some embodiments, the milling process may begin with agglomerates having a particle size ranging from 5 microns to 20 microns. The particles size of the agglomerates may be reduced using a high-shear mixer, two or three roll mixers, homogenizers, bead mills, ultrasonic pulverizer and a combination thereof. A high-shear mixer disperses, or transports, one phase or ingredient (liquid, solid, gas) into a main continuous phase (liquid), with which it would normally be immiscible. A rotor or impellor, together with a stationary component known as a stator, or an array of rotors and stators, is used either in a tank containing the solution to be mixed, or in a pipe through which the solution passes, to create shear. In some embodiments, the high shear mixer may be a batch high-shear mixers, an inline powder induction, a high-shear granulator, an ultra-high-shear inline mixers and a combinations thereof.

Other means for reducing the particle size of the agglomerates to the primary particle size of the inorganic fullerene-like and/or tube-like particles having the molecular formula $MX_2$ include an attritor, agitator, ball mill, bead mill, basket mill, colloid mill, high speed disperser, edge runner, jar mill, low speed paddle mixer, variable speed mixer, paste mixer, ribbon blender, pug mixer, nauta mixer, sand/perl mill, triple roll mill, two roll mill, planetary mixer, slow speed mixer, high speed mixer, twin shaft mixer, multi shaft mixer, sigma kneader, rotor-stator mixer, homogenizer/emulsifier, high shear mixer, conical blender, V-blender, double cone blender, suspended mixer and combinations thereof. The particle size of the agglomerates may also be reduced using a sonicator. The mixing may be performed at room temperature or at an elevated temperature.

In some embodiments, the fluid medium for the lubricant is mixed with the inorganic fullerene-like and/or tube-like particles having the molecular formula $MX_2$ during the milling step in which the agglomerates of the inorganic fullerene-like and/or tube-like particles having the molecular formula $MX_2$ are mechanically broken down into their primary size. The inorganic fullerene-like and/or tube-like particles having the molecular formula $MX_2$ may be mixed with the fluid medium in an amount ranging from 0.1% to 60% by volume. In another embodiment, the inorganic fullerene-like and/or tube-like particles having the molecular formula $MX_2$ may be mixed with the fluid medium in an amount ranging from 0.5% to 40% by volume. In yet another embodiment, the inorganic fullerene-like and/or tube-like particles having the molecular formula $MX_2$ may be mixed with the fluid medium in an amount ranging from 0.5% to 20% by volume.

In some embodiments, the agglomerates of the inorganic fullerene-like and/or tube-like particles having the molecular formula $MX_2$ is reduced during the milling step to a diameter ranging from 1 nm to 15 μm for fullerene like geometries. In another embodiment, the agglomerates of the inorganic fullerene-like and/or tube-like particles having the molecular formula $MX_2$ is reduced during the milling step to a diameter ranging from 2 nm to 10 μm for fullerene like geometries. In yet another embodiment, the agglomerates of the inorganic fullerene-like and/or tube-like particles having the molecular formula $MX_2$ is reduced during the milling step to a diameter ranging from 5 nm to 5 μm for fullerene like geometries. Following milling, the inorganic fullerene-like and/or tube-like particles having the inorganic fullerene like geometry may have a diameter that is any value within the above ranges. It is noted that the above dimensions are provided for illustrative purposes only, and are not intended to limit the present disclosure.

In some embodiments, the agglomerates of the inorganic fullerene-like and/or tube-like particles having the molecular formula $MX_2$ is reduced during the milling step to a diameter ranging from 1 nm to 150 nm, and a length that ranges from 1 nm to 20 cm, for tube like geometries. In another embodiment, the agglomerates of the inorganic fullerene-like and/or tube-like particles having the molecular formula $MX_2$ is reduced during the milling step to a diameter ranging from 5 nm to 125 nm, and a length that ranges from 5 nm to 15 cm, for tube like geometries. In yet another embodiment, the agglomerates of the inorganic fullerene-like and/or tube-like particles having the molecular formula $MX_2$ is reduced during the milling step to a diameter ranging from 10 nm to 100 nm, and a length that ranges from 100 nm to 10 cm, for tube-like geometries. Following milling, the inorganic fullerene-like and/or tube-like particles having the inorganic tube-like geometry may have a diameter and length that is any value within the above ranges. It is noted that the above dimensions are provided for illustrative purposes only, and are not intended to limit the present disclosure.

In some embodiments, once the agglomerates of the inorganic fullerene-like and/or tubelike particles having the molecular formula $MX_2$ are broken down into their primary size, the functionalizing agent may be added to the mixture of the fluid medium and the inorganic fullerene-like and/or tube-like particles having the molecular formula $MX_2$.

A functionalizing agent of amine may be added to the mixture in an amount ranging from 0.1 wt % to 50 wt. % of the inorganic fullerene-like and/or tube-like particles. For example, when functionalizing agent is an amine, such as oleylamine, the minimum functionalizing agent would be 0.1 g for 1 gram of inorganic fullerene-like and/or tube-like particles having the molecular formula $MX_2$, e.g. 1 gram of fullerene-like tungsten disulfide ($WS_2$), in 100 grams of the fluid medium, e.g., an olefin based oil. For example for 100 grams of isomerized alpha olefin fluid (drilling fluid) 1 wt % i.e. 1 gram of $WS_2$ fullerene-like particles and 0.1 gram of oleilamine are added). In another example, when functionalizing agent is an amine, such as oleylamine, the maximum functionalizing agent would be 20 grams for 1 gram of inorganic fullerene-like and/or tube-like particles having the molecular formula $MX_2$, e.g. 1 gram of fullerene-like tungsten disulfide ($WS_2$) or molybdenum disulfide ($MoS_2$), in 100 grams of the fluid medium, e.g., an olefin based oil.

A functionalizing agent of silane may be added to the mixture in an amount ranging from 0.1 wt % to 50 wt. % of the inorganic fullerene-like and/or tube-like particles. For example, when functionalizing agent is a silane, e.g., octadecyltrichlorosilane (OTS), the minimum functionalizing agent would be 0.1 g for 1 gram of inorganic fullerene-like and/or tube-like particles having the molecular formula $MX_2$, e.g., 1 gram of fullerene-like tungsten disulfide ($WS_2$), in 100 grams of the fluid medium, e.g., an olefin based oil. In another example, when functionalizing agent is an silane, e.g., octadecyltrichlorosilane (OTS), the maxiumum functionalizing agent would be 50 grams for 1 gram of inorganic fullerene-like and/or tube-like particles having the molecular formula $MX_2$, e.g. 1 gram of fullerene-like tungsten disulfide ($WS_2$), in 100 grams of the fluid medium, e.g., an olefin based oil.

The functionalizing agent applied to the mixture of the fluid medium and the inorganic fullerene-like and/or tube-like particles having the molecular formula $MX_2$ provide dispersions that do not agglomerate or settle for a period of time that may range from 3 hours to 5 years. In another embodiment, the functionalizing agent applied to the mixture of the fluid medium and the inorganic fullerene-like and/or tube-like particles having the molecular formula $MX_2$ provide dispersions that do not agglomerate or settle for a period of time that may range from 5 hours to 3 years. In yet another embodiment, the functionalizing agent applied to the mixture of the fluid medium and the inorganic fullerene-like and/or tube-like particles having the molecular formula $MX_2$ provide dispersions that do not agglomerate or settle for a period of time that may range from 24 hours to 1 year.

In one embodiment, the lubricant further includes an additive for antiwear performance, extreme pressure performance, anticorrosion performance, rust inhibiting performance, antifoam, viscosity modifying, friction modifying additives. The extreme pressure and antiwear additives may be selected from at least one of organophosphorus, organophosphorus sulfur, organosulphur, chlorine, sulfur-phosphorus-boron compounds and combinations thereof.

Figure 3:
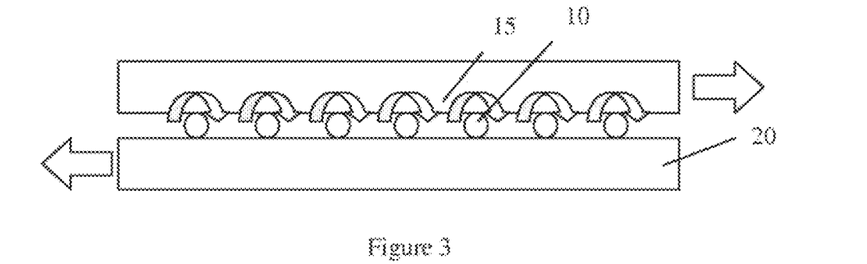
FIGS. 3 and 4 are pictorial views depicting an intercalation compound that is in simultaneous contact with two surfaces being lubricated by a rolling action of the intercalation compound, in accordance with one embodiment of the present disclosure.

FIG. 3 depicts the application of the lubricant including the fluid medium containing the inorganic fullerene-like and/or tube-like particles having the molecular formula $MX_2$ and the functionalizing agent to a surface to be lubricated. FIG. 3 depicts how the sphere geometry of the inorganic fullerene-like particles 10 having the molecular formula $MX_2$ provide roller effect when simultaneously in contract with opposing surfaces 15, 20 that are being lubricated. More specifically, the rolling action of the sphere geometry of the inorganic fullerene-like particles 10 provides a low friction sliding motion between the opposing surfaces 15, 20 being lubricated. The sphere geometry of the inorganic fullerene-like particles 10 acts as an anti-friction agent enhancing the effectiveness of the fluid lubricant. The column shape of the tube-like particles having the molecular formula $MX_2$ provide a roller effect similar to the performance that is provided by the sphere geometry of the inorganic fullerene-like particles 10.

Figure 4:
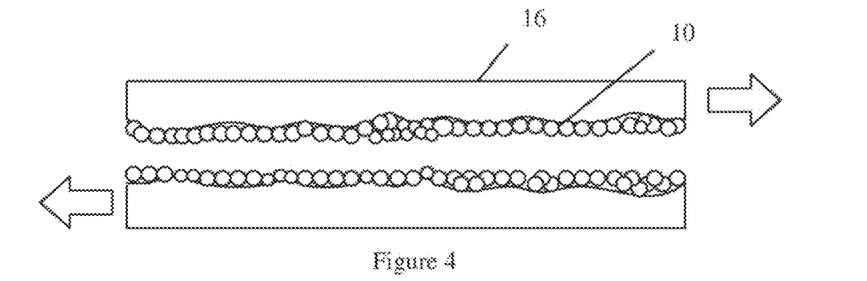
Figure 5:
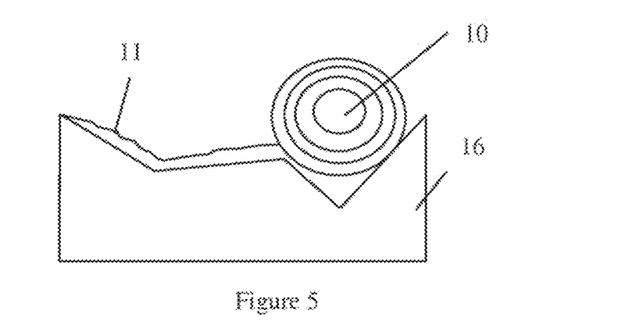
FIG. 5 is a pictorial view depicting a layer of the intercalation compound adhering to a surface that is being lubricated by the intercalation compound, in accordance with one embodiment of the present disclosure.

FIGS. 4 and 5 further depict a surface reconditioning effect that is provided by the lubricant including the fluid medium containing the inorganic fullerene-like and/or tube-like particles 10 having the molecular formula $MX_2$ and the functionalizing agent. More specifically, the inorganic fullerene-like and/or tube-like particles 10 having the molecular formula $MX_2$ are layered structures, in which when the exterior layers contact the surface being lubricated, the exterior layer 11 peels (also referred to as exfoliates) from the inorganic fullerene-like and/or tube-like particles and adheres to the surface 16 being lubricated, as depicted in FIG. 5. An inorganic fullerene-like and/or tube-like particle of tungsten disulfide ($WS_2$) may have alternating layers of tungsten (W) and sulfur (S). An inorganic fullerene-like and/or tube-like particle of molybdenum disulfide ($MoS_2$) may have alternating layers of molybdenum (Mo) and sulfur (S). One molybdenum (Mo) atom is sandwiched between two hexagonally packed sulfur atoms. The bonding between Mo and two S is covalent, however the bonding between each $MoS_2$ sandwich is week (Vander Waals). In this manner, the inorganic fullerene-like and/or tube-like particles having the molecular formula $MX_2$, such as molybdenum disulfide ($MoS_2$) and tungsten disulfide ($WS_2$), can deposit a metal-chalcogen (metal-sulfide for example) layer, such as molybdenum ($MoS_2$) or tungsten ($WS_2$), on the eroded surface being lubricated. Therefore, the inorganic fullerene-like and/or tube-like particle can recondition eroded surfaces, i.e., smooth rough and damaged surfaces, and lubricate to protect from additional wear. In some embodiments, the hollow feature of the inorganic fullerene-like and/or tube-like particle provides enhanced impact resistance.

In some embodiments, the lubricant may further include a carbon containing nanomaterial, such as carbon nanotubes, e.g., single wall carbon nanotubes (CNT) or multi-wall carbon nanotubes (SWNT), or graphitic materials, such as carbon black (CB), graphitic fibers, graphite platelets and diamond like carbon (DLC). In one embodiment, the carbon containing nanomaterial is provided by carbon nanotubes that may have a high purity on the order of about 95% to about 99% carbon. In an even further embodiment, the carbon nanotubes have a high purity on the order of about 99% or greater. In one embodiment, the carbon nanotubes may be provided by laser vaporization. In one embodiment, the single wall carbon nanotubes are formed using laser vaporization in combination with a catalyst, such as a metal catalyst. In one embodiment, the catalyst is supported on a substrate, such as a graphite substrate, or the catalyst may be floating metal catalyst particles. In one embodiment, the metal catalyst may be composed of Fe, Ni, Co, Rh, Y or alloys and combinations thereof.

The diameter of a single wall carbon nanotube may range from about 1 nanometer to about 50 nanometers. In another embodiment, the diameter of a single wall carbon nanotube may range from about 1.2 nanometers to about 1.6 nanometers. In one embodiment, the nanotubes used in accordance with the present invention have an aspect ratio of length to diameter on the order of approximately 200:1.

The carbon nanotubes comprise a majority of carbon typically being of high purity. In other examples, the carbon nanotubes include a carbon content ranging from being greater than 50%, wherein a purification process is utilized to provide carbon nanotubes having of high purity, such as greater than 90% carbon. In one embodiment, the carbon nanotubes may be purified by a process that includes an acid treatment followed by an oxidation. In one embodiment, the acid treatment may include treatment and oxidation steps are provided by a dilute $HNO_3$ reflux/air oxidation procedure.

Other methods of forming the carbon nanotubes may also be employed, such as chemical vapor deposition (CVD). In another embodiment, the carbon nanotubes may be multi-walled. Carbon black (also known as acetylene black, channel black, furnace black, lamp black or thermal black) is also suitable for providing the at least one carbon containing nanomaterial that is present in the lubricant. Carbon black is a material produced by the incomplete combustion of heavy petroleum products such as FCC tar, coal tar, ethylene cracking tar, and a small amount from vegetable oil.

In some embodiments, the carbon containing nanomaterial may be present in the lubricant in an amount ranging from 0.1 wt % to 50 wt. %. In another embodiment, the carbon containing nanomaterial may be present in the lubricant in an amount ranging from 0.1 wt % to 40 wt. %. In yet another embodiment, the carbon containing nanomaterial in the lubricant in an amount ranging from 0.1 wt % to 25 wt. %.

In some applications, the above described lubricant may be suitable for engine oil treatments for automotive, transportation, and generator applications. For example, the engine oil treatments may be suitable for gasoline and diesel engines used in cars, trucks, industrial engines, boats and motorcycles. Other automotive applications for the above described lubricant include gears, transmissions, e.g., manual and automatic transmissions, rear and front differentials, transfer cases, such as those used in 4×4 vehicles and trucks, and final drive apparatus, such as those used in tractors and earth moving equipment. Industrial applications include gears, chains, conveyors, and sliding components.

Figure 6:
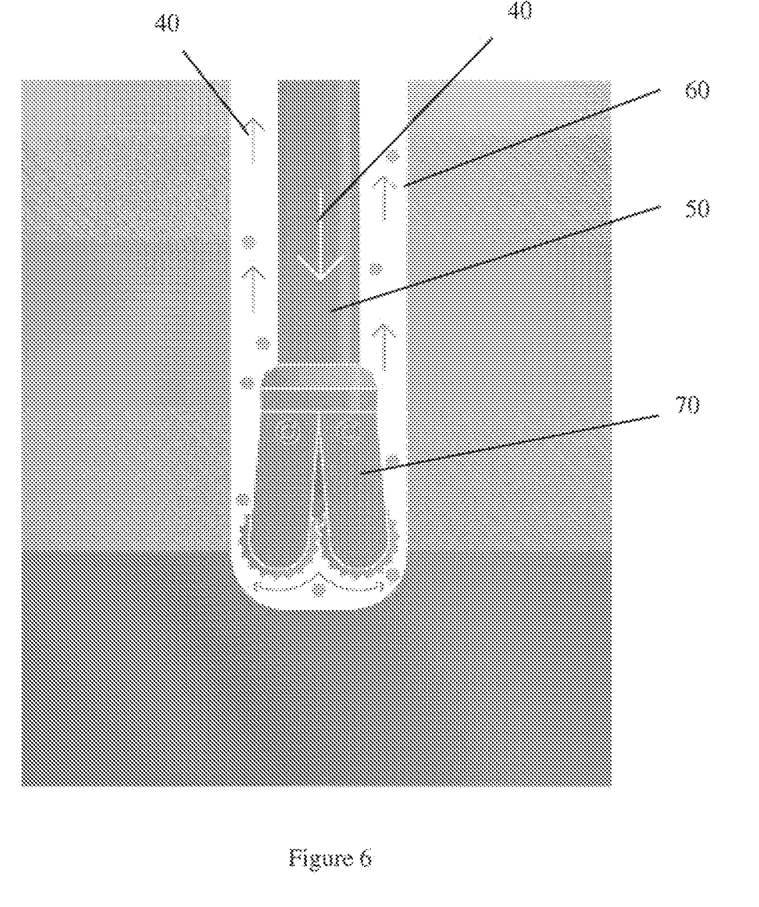
FIG. 6 is a pictorial view of a drilling operation using the drilling fluid including the intercalation compound of a metal chalcogenide having molecular formula $MX_2$, which has a fullerene-like and/or tube-like geometry, in accordance with one embodiment of the present disclosure.

In another application, the methods and compositions can provide a drilling fluid for subterranean drilling. FIG. 6 is a pictorial view of a drilling operation using the drilling fluid (flow identified by reference number 40) including the intercalation compound of a metal chalcogenide having molecular formula $MX_2$, which has a fullerene-like and/or tube like geometry. In one embodiment, the subterranean drilling method may include providing a drilling member 50, and applying the drilling member 50 to a terrane an surface to form a subterraneon wellbore 60. The drilling member 50 includes at least a drill string and a drill component.

The subterranean drilling method may further include lubricating at least one of the subterraneon wellbore 19 and the drilling member 50 with a drilling fluid including at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof. The intercalation compound has a fullerene-like structure or tubular-like structure. The intercalation compound is present in the drilling fluid 40 in an amount of greater than 0.1 wt % by weight. In some embodiments, the drilling fluid 40 may further includes a functionalizing agent. The functionalizing agent provides that the intercalation compound is kept in suspension within the drilling fluid 40.

Drilling fluid, also referred to as drilling mud, is used to aid the drilling of boreholes, also referred to as wellbores 50, into the earth. Often used while drilling oil and natural gas wells and on exploration drilling rigs, drilling fluids are also used for much simpler boreholes, such as water wells. One of the most critical roles of drilling mud is as a lubricant. Drilling generates tremendous friction, which can damage the drill or the formation being drilled. Drilling mud cuts down on the friction, lowering the heat of drilling and reducing the risk of friction-related complications. The mud also acts as a carrier for the materials being drilled, with material becoming suspended in the mud and then being carried up the drill to the surface. Using drilling mud protects the stability of a borehole by controlling variables such as friction and pressure. In some embodiments, the function of drilling fluids further include providing hydrostatic pressure to prevent formation fluids from entering into the well bore, keeping the drill bit cool 70 and clean during drilling, carrying out drill cuttings, and suspending the drill cuttings while drilling is paused and when the drilling assembly is brought in and out of the hole.

In some embodiments, the fluid medium for the drilling fluid used in accordance with the methods and structures disclosed herein may be selected from the group consisting of water, air and water, air and foaming agent, a water based mud, an oil based mud, a synthetic based fluid, and a combination thereof. A most basic water-based mud system begins with water, then clays and other chemicals are incorporated into the water to create a homogenous blend. The clay (called "shale" in its rock form) is usually a combination of native clays that are suspended in the fluid while drilling, or specific types of clay that are processed and sold as additives for the water-based mud system. One example of an additive used in water-based mud systems is bentonite. Other additives, such as calcium chloride, calcium bromide, zinc bromide, potassium formate, calcium carbonate, ground cellulose, bentonite, natural & synthetic polymer, asphalt and gilsonite, are added to a water based mud system to achieve various effects, including: viscosity control, shale stability, enhance drilling rate of penetration, cooling and lubricating of equipment.

Oil-based mud can be a mud where the base fluid is a petroleum product such as diesel fuel. Oil-based muds contain oil as the continuous phase and water as a contaminant, and not an element in the design of the mud. They typically contain less than 5% (by volume) water. Oil-based muds are usually a mixture of diesel fuel and asphalt, however can be based on produced crude oil and mud. Oil-based muds are used for many reasons, some being increased lubricity, enhanced shale inhibition, and greater cleaning abilities with less viscosity. Oil-based muds also withstand greater heat without breaking down. Additives for oil based muds include emulsifying agents (alkaline soaps and fatty acids), wetting agents (dodecylbenzene sulfonate), water, barite or barium sulfate, (weighting agent), asbestos (employed as viscosification agent) and/or, aminetreated clays (also as viscosification agent). Synthetic-based fluid (Otherwise known as Low Toxicity Oil Based Mud or LTOBM) is a mud where the base fluid is a synthetic oil.

Some other additives that may be employed in drilling fluids include calcium carbonate, crushed or ground marble, limestone, dolomite (calcium magnesium carbonate), zinc carbonate, barium carbonate, lithium carbonate, iron carbonate, other metal carbonates, hematite, ilmenite, magnesium oxide, manganese tetroxide, zinc oxide, magnesium oxychloride, colemanite, ulexite, analcite, apatite, bauxite, brucite, gibsite, hydrotalcite, other metal oxides, metal hydroxides, magnesium oxysulfate, other metal sulfates, metal tungstates, metal fluorides, lithium phosphate, other metal phosphates, magnesium sulfite, lead sulfide, metal peroxides, magnesium potassium phosphate hexahydrate, magnesium hydrogen phosphate trihydrate, magnesium ammonium phosphate hexahydrate, metal fluorosilicates, sodium chloride, other water-soluble salts, crushed or ground nut shells, crushed or ground seeds, crushed or ground fruit pits, materials obtained from barks of trees, calcined petroleum coke, asphalts, barite particles, clay particles, micaparticles, talc particles, silica particles, sands, feldspar, bauxite particles, ceramic particles, cement particles, melamine, solid or hollow micro spheres, graphitic materials, other forms of carbon, celluloses, starches, polysaccharides, acrylic polymers, natural rubbers, synthetic rubbers, styrene-diene diblock and triblock copolymers, other natural or synthetic polymers, expanded polystyrene beads, other foam beads, carbon fibers, glass fibers, polymer fibers, other fibers, water, dispersants, thinners, crystalline additives of low molecular weight (such as 1-Sendo-Borneol, camphor, iodine, beta carotene, lycophene, cholesterol, lanosterol, or agnosterol), and combinations thereof.

It is noted that the above described fluid mediums and the inorganic fullerene-like and/or tube-like particles having the molecular formula $MX_2$ for the lubricants described with reference to FIGS. 1-5, may be suitable for use with the drilling fluid that is described with reference to FIG. 6. Further, the inorganic fullerene-like and/or tube-like particles having the molecular formula $MX_2$ may be stabilized within the drilling fluid using the functionalizing agents and methods that are also described above with reference to FIGS. 1-5.

The lubricants and drilling fluids disclosed herein provide an increase in friction reduction of up to two times, and more, when compared to conventional materials, and a wear reduction of up to three times, and more. The lubricants and drilling fluids disclosed herein also provide a surface reconditioning effect. Applications for the drilling fluids disclosed herein may include application to drill string, bit and other mechanical parts used in subterranean drilling. Other applications for the lubricants disclosed herein can include ski waxes, anti-stick coatings and antistick scratches.

The following examples are provided for illustrative purposes and are not intended to limit the present disclosure.

EXAMPLES

Friction Reduction

Figure 7:
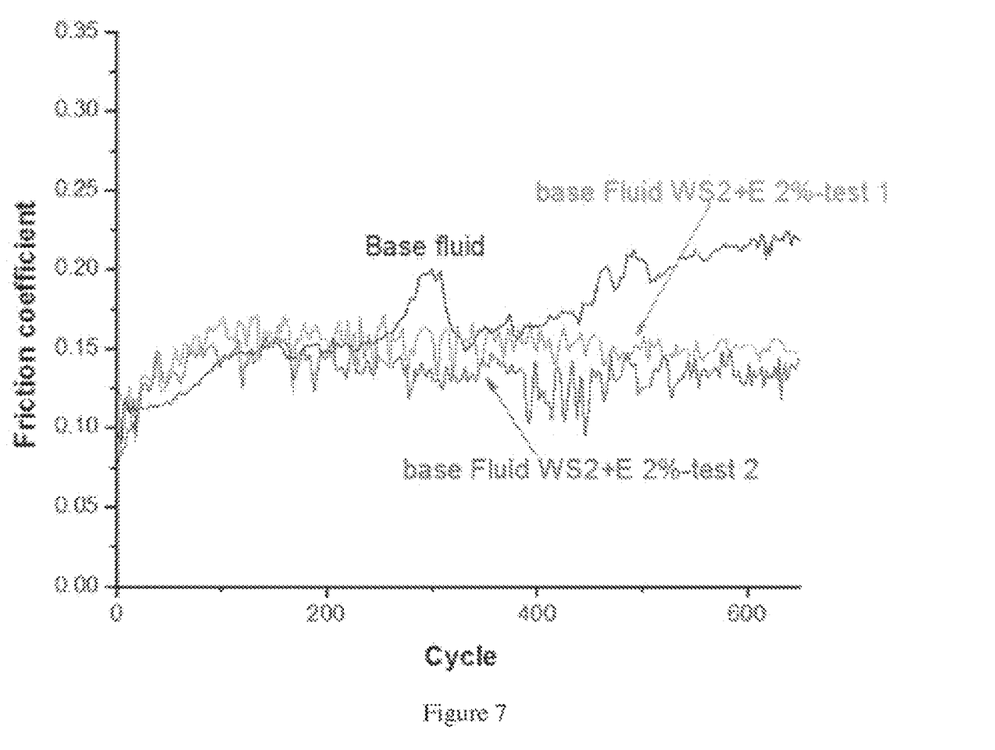
FIG. 7 is a plot of data from a pin on disc test for drilling fluid including the intercalation compound of a metal chalcogenide having molecular formula $MX_2$, which has a fullerene-like and/or tube-like geometry in comparison to a drilling fluid without the intercalation compound, in accordance with one embodiment of the present disclosure.

Pin on disc tests (stainless steel (SS) ball or a stainless steel (SS) substrate) were performed using test samples of drilling fluid of an isomerized alpha olefin (hydrocarbon fluid with isomerized molecules rearranged) with additives of 2% tungsten disulfide ($WS_2$) fullerenelike geometry particles and a functionalization agent of ε-caprolactam monomer, and a comparative sample of drilling fluid of an isomerized alpha olefin (hydrocarbon fluid with isomerized molecules rearranged) without additives. The test included a 1N load, a 0.4 cm/s speed and a test duration of 30 minutes. The data was plotted in FIG. 7, in which the tests samples of drilling fluid of an isomerized alpha olefin (hydrocarbon fluid with isomerized molecules rearranged) with additives of 2% tungsten disulfide ($WS_2$) fullerene-like geometry particles and a functionalization agent of E-caprolactam monomer are identified in FIG. 7 as "base fluid $WS_2$+E 2%-test 1" and "base fluid $WS_2$+E 2%-test 2". The data from testing of the comparative sample is identified in FIG. 7 as "base fluid". The data included in FIG. 7 illustrated a 36% decrease in friction for the test samples of isomerized alpha olefin with additives of 2% tungsten disulfide ($WS_2$) fullerene-like geometry particles and a functionalization agent of ε-caprolactam monomer when compared to the comparative sample that did not include the tungsten disulfide ($WS_2$) fullerene-like geometry particles. There was also no measurable friction increase measured for the test samples of isomerized alpha olefin with additives of 2% tungsten disulfide ($WS_2$) fullerene-like geometry particles over a period of 650 cycles.

Wear Reduction

Figure 8:
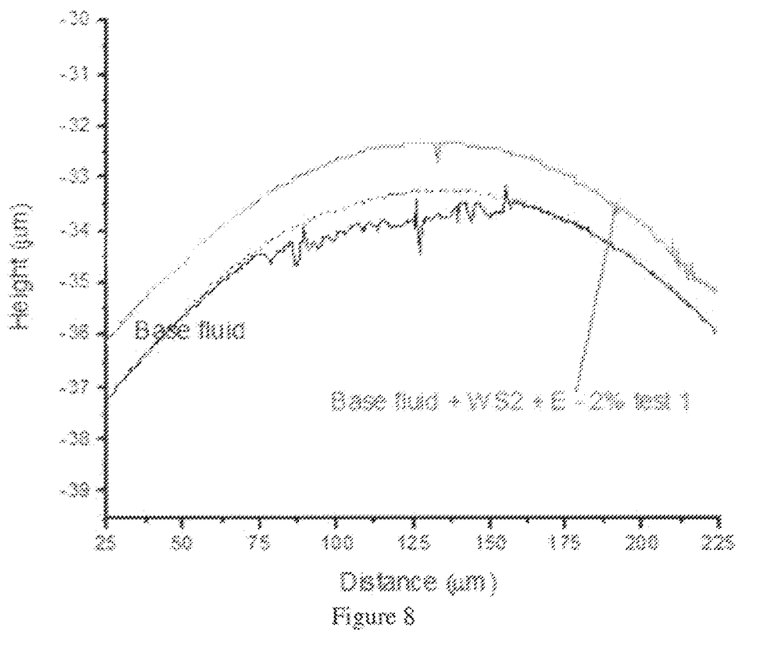
FIG. 8 depicts profilometry curves for the ball from the pin on disc test that provided the data in FIG. 7.
Figure 9A:
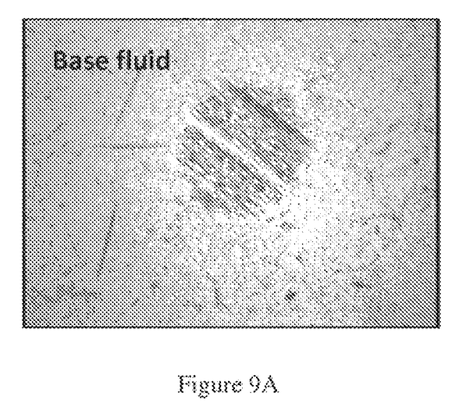
FIGS. 9A, 9B and 9C are optical microscope images of the ball from the pin on disc test that provided the data in FIG. 7.
Figure 9B:
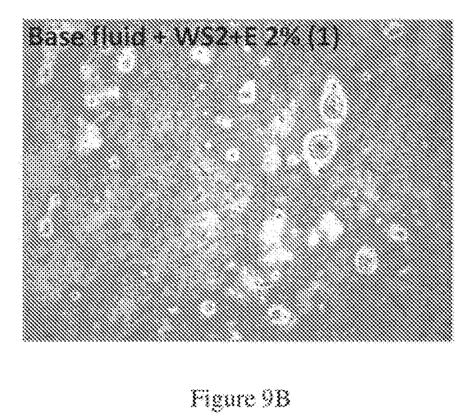
Figure 9C:
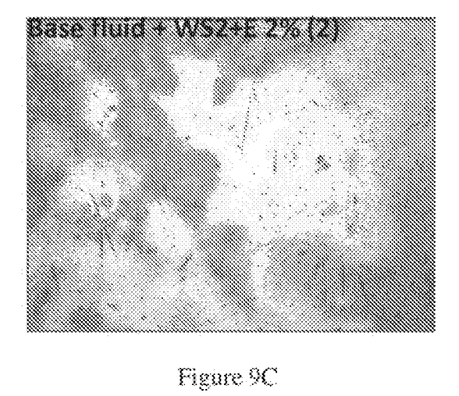

FIG. 8 depicts profilometry curves measured for the ball from the pin on disc test that provided the data in FIG. 7. The profilometry curve plotted in FIG. 8 for the test sample is identified as "base fluid $WS_2$+E 2%-test 1". The profilometry curve plotted in FIG. 8 for the comparative sample is identified as "base fluid". The profilometry curves measured from the ball of the pin on disc test that included the drilling fluid of isomerized alpha olefin (hydrocarbon fluid with isomerized molecules rearranged) with additives of 2% tungsten disulfide ($WS_2$) fullerene-like geometry particles and a functionalization agent of ε-caprolactam monomer indicated no wear. FIGS. 9B and 9C are optical microscope images of the ball from the pin on disc test including the drilling fluid of isomerized alpha olefin (hydrocarbon fluid with isomerized molecules rearranged) with additives of 2% tungsten disulfide ($WS_2$) fullerene-like geometry particles and a functionalization agent of E-caprolactam monomer. There is not visible wear depicted in FIGS. 9B and 9C. The profilometry curve for the ball of the comparative example of isomerized alpha olefin without tungsten disulfide ($WS_2$) fullerene-like geometry particles illustrated ball volume loss. Specifically, a scar having a depth of 0.5 μm was measured. The scar on the ball from the comparative example test is clearly depicted in the optical microscope image depicted in FIG. 9A.

Reduction of Engine Wear

Figure 10:
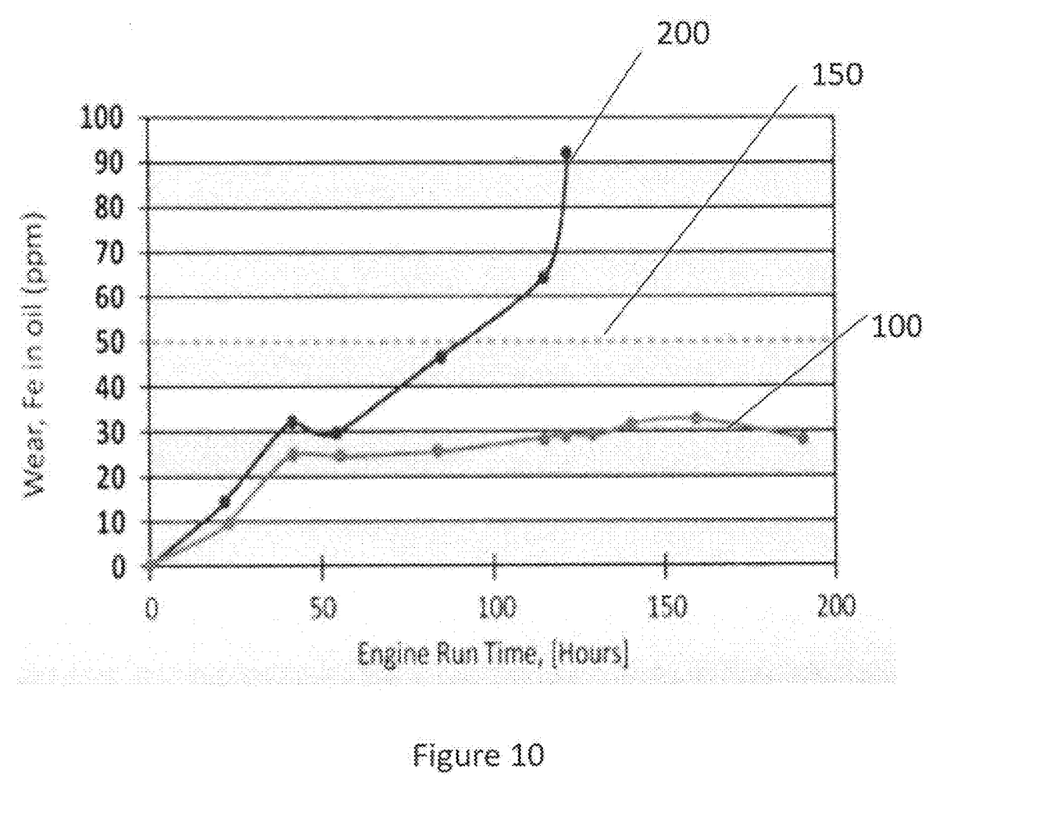
FIG. 10 is a plot of engine wear (measured by presence of iron (Fe) in oil (ppm) as a function of engine run time for a sample of 30 SAE oil including at least one intercalation compound of a metal chalcogenide having molecular formula $MX_2$ in comparison with a comparative sample of 30 SAE oil without the intercalation compound.

FIG. 10 is a plot of engine wear (measured by presence of iron (Fe) in oil (ppm) as a function of engine run time for a sample of 30 SAE oil including at least one intercalation compound of a metal chalcogenide having molecular formula $MX_2$ in comparison with a comparative sample of 30 SAE oil without the intercalation compound. In this example, the intercalation compound was fullerene like tungsten disulfide ($WS_2$) having a diameter ranging from 30 nm to 200 nm, and present in 30 SAE oil in an amount ranging from 0.1 wt % to 7 wt %. The plot identified by reference number 100 is the engine wear as a function of engine run time measured by the presence of iron (Fe)(worn from internal engine components) in SAE 30 oil lubricating the internal engine components during engine run time, wherein the oil lubricating the engine during the engine run time contained fullerene like tungsten disulfide ($WS_2$) intercalation compounds, in accordance with lubricants disclosed herein. The plot identified by reference number 200 is a comparative example, which was run in an identical engine using identical SAE oil with the exception that the oil did not include fullerene like tungsten disulfide ($WS_2$) intercalation compounds. The dashed line identified by reference number 150 illustrates the oil change level of iron (Fe) being measured in the oil. As indicated by plot in FIG. 10, when the engine run time approaches approximately 90 hours the iron content within the comparative example of oil (which does not contain fullerene like tungsten disulfide ($WS_2$) intercalation compounds) reaches the oil change level, whereas the iron (Fe) content in the oil treated with the fullerene like tungsten disulfide ($WS_2$) intercalation compounds does not reach the oil change level for up to approximately 180 hours.

While the claimed methods and structures has been particularly shown and described with respect to preferred embodiments thereof, it will be understood by those skilled in the art that the foregoing and other changes in form and details may be made therein without departing from the spirit and scope of the presently claimed methods and structures.

What is claimed is:

1. A lubricant comprising:
   a fluid medium;
   at least one intercalation compound of a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof, wherein the intercalation compound has a fullerene-like structure having a caged geometry that is layered at its periphery, or the intercalation compound has a tube-like structure, and the intercalation compound is present in the lubricant in an amount of greater than 0.1 wt % by weight; and
   a functionalizing agent that interacts with the at least one intercalation compound of the metal chalcogenide having molecular formula $MX_2$ to form a succinimide group surface functionalization on the at least one intercalation compound to maintain a dispersion of the intercalation compound.

2. The lubricant of claim 1, wherein the metal chalcogenide is $MoS_2$.

3. The lubricant of claim 1, wherein the metal chalcogenide is $WS_2$.

4. The lubricant of claim 1, wherein the fluid medium comprises Group I, II, III, IV, and V lubricants, synthetic oils, mineral oils, water based and oil based drilling fluids and bio-lubricants or combinations thereof.

5. The lubricant of claim 4, wherein the synthetic oils comprise polyalpha-olefins, olefins, isomerized olefins, synthetic esters, phosphate esters, silicate esters, polyalkylene glycols or combinations thereof.

6. The lubricant of claim 5, wherein the bio-lubricants comprise lanolin, whale oil, canola oil, castor oil, palm oil, sunflower seed oil, rapeseed oil, tall oil or combinations thereof.

7. The lubricant of claim 1, wherein the intercalation compound of the metal chalcogenide has a diameter ranging from 5 nm to 5 µm.

8. A lubricant comprising:
   a fluid medium;
   at least one intercalation compound of a metal chalcogenide having molecular formula $MX_2$, where M is a metallic element selected from the group consisting of tungsten (W), and combinations thereof, and X is sulfur (S) and combinations thereof, wherein the intercalation compound has a fullerene-like structure having a caged geometry that is layered at its periphery and the intercalation compound is present in the lubricant in an amount of greater than 0.1 wt % by weight; and
   a functionalizing agent of a phosphorous containing compound that interacts with the at least one intercalation compound of the metal chalcogenide having molecular formula $MX_2$ to maintain a dispersion of the intercalation compound in the fluid medium.

9. The lubricant of claim 8, wherein the metal chalcogenide is $MoS_2$.

10. The lubricant of claim 8, wherein the metal chalcogenide is $WS_2$.

11. The lubricant of claim 8, wherein the phosphorus containing compound is a phosphorus containing acid.

12. The lubricant of claim 11, wherein the phosphorus containing acid is a phosphonic acid selected from the group consisting of octylphosphonic acid, laurylphosphonic acid, decylphosphonic acid, dodecylphosphonic acid, octadecylphosphonic acid, monopolyethylene glycol phosphonate and combinations thereof.

13. The lubricant of claim 8, wherein the fluid medium comprises Group I, II, III, IV, and V lubricants, synthetic oils, mineral oils, water based and oil based drilling fluids and bio-lubricants or combinations thereof.

14. The lubricant of claim 8, wherein the intercalation compound of the metal chalcogenide has a diameter ranging from 5 nm to 5 µm.

15. A lubricant comprising:
    a fluid medium;
    at least one intercalation compound of a metal chalcogenide having molecular formula $MX_2$, where M is a metallic element selected from the group consisting of tungsten (W) and combinations thereof, and X is sulfur (S), wherein the intercalation compound has a fullerene-like structure having a caged geometry that is layered at its periphery, and the intercalation compound is present in the lubricant in an amount of greater than 0.1 wt % by weight; and
    a functionalizing agent selected from the group consisting of silanes, thiols, ionic, anionic, cationic, nonionic surfactants, amine based dispersant and surfactants, succinimide groups, fatty acids, acrylic polymers, copolymers, polymers, monomers and combinations thereof, wherein the functionalizing agent interacts with the at least one intercalation compound of a metal chalcogenide having molecular formula $MX_2$ to maintain a dispersion of the intercalation compound in the fluid medium.

16. The lubricant of claim 15, wherein the functionalizing agent provides that a surface of the intercalation compound is functionalized by forming an adsorption-solvate protective layer on the intercalation compound, and preventing agglomeration under the action of short-range forces of molecular attraction.

17. The lubricant of claim 15, wherein the functionalizing agent comprise a headgroup that interacts primarily with the surface of the at least one intercalation compound of the metal chalcogenide, and a tailgroup that interacts with the fluid medium.

18. The lubricant of claim 17, wherein the headgroup has a composition selected from the group consisting of alkoxy, hydroxyl, halo, thiol, silanol, amino, ammonium, phosphate, phosphonate, phosphonic acid, phosphinate, phosphinic acid, phosphine oxide, sulfate, sulfonate, sulfonic acid, sulfinate, carboxylate, carboxylic acid, carbonate, boronate, stannate, hydroxamic acid, succinimide and combinations thereof.

19. The lubricant of claim 17, wherein the tailgroup has a composition selected from the group consisting of alkyl, aryl, cycloalkyl, cycloalkenyl, haloalkyl, oligo-ethylene glycol, oligo-ethyleneimine, dialkyl ether, dialkyl thioether, aminoalkyl, and combinations thereof.

20. The lubricant of claim 15, wherein the intercalation compound of the metal chalcogenide has a diameter ranging from 5 nm to 5 µm.

\* \* \* \* \*